(12) United States Patent
Won

(10) Patent No.: US 9,975,555 B2
(45) Date of Patent: May 22, 2018

(54) METHOD FOR PREVENTING DAMAGE TO DRIVING SYSTEM IN VEHICLES

(71) Applicant: Hyundai Motor Company, Seoul (KR)

(72) Inventor: Young Deok Won, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 61 days.

(21) Appl. No.: 14/959,428

(22) Filed: Dec. 4, 2015

(65) Prior Publication Data

US 2017/0096141 A1    Apr. 6, 2017

(30) Foreign Application Priority Data

Oct. 1, 2015 (KR) .......... 10-2015-0138390

(51) Int. Cl.
*B60W 30/184* (2012.01)
*B62D 6/10* (2006.01)

(52) U.S. Cl.
CPC ...... *B60W 30/184* (2013.01); *B60W 30/1846* (2013.01); *B62D 6/10* (2013.01); *B60W 2520/263* (2013.01); *B60W 2520/28* (2013.01); *B60W 2540/10* (2013.01); *B60W 2540/106* (2013.01); *B60W 2540/18* (2013.01); *B60W 2710/0666* (2013.01); *B60W 2720/30* (2013.01)

(58) Field of Classification Search
CPC . B60W 2710/0666; B60W 2510/1005; B60W 2540/18; B60W 30/1846; B60W 30/184; B60W 10/06; B60W 2520/10; B60W 2510/0638; B60W 2720/30; B60W 2520/263; B60W 2540/106; B60W 2540/263; B60W 10/0666; B60W 2520/28; B60W 2540/10; B60K 28/10; B62D 6/10
USPC .......................... 701/84–102, 79, 81
See application file for complete search history.

(56) References Cited

U.S. PATENT DOCUMENTS

| | | | |
|---|---|---|---|
| 6,697,725 B1 * | 2/2004 | Williams | B60K 23/0808 180/249 |
| 2008/0054537 A1 * | 3/2008 | Harrison | B60G 17/016 267/64.16 |
| 2011/0066342 A1 * | 3/2011 | Ozaki | B60T 7/042 701/70 |
| 2012/0143455 A1 * | 6/2012 | Lee | B60K 28/10 701/84 |

FOREIGN PATENT DOCUMENTS

| | | |
|---|---|---|
| JP | 7-186767 A | 7/1995 |
| JP | 2004-92570 A | 3/2004 |

(Continued)

*Primary Examiner* — Nga X Nguyen
(74) *Attorney, Agent, or Firm* — Morgan, Lewis & Bockius LLP

(57) ABSTRACT

A method for preventing damage to a driving system in vehicles may include determining whether a 4-wheel drive vehicle turns based on a steering angle signal, determining, based on an accelerator opening rate signal of the vehicle, whether a maximum torque causing damage to front wheel driveshafts is produced, checking a bump stroke amount of the vehicle and determining whether the front wheel driveshafts are likely to be damaged by a maximum torque transferred to the front wheel driveshafts when the vehicle turns, and lowering, when the front wheel driveshafts are likely to be damaged, a maximum torque of a 4-wheel drive torque applied to the front wheel driveshafts.

12 Claims, 2 Drawing Sheets

(56) References Cited

FOREIGN PATENT DOCUMENTS

| JP | 2006-205835 A | 8/2006 |
| JP | 2008-113541 A | 5/2008 |
| JP | 2012-116229 A | 6/2012 |
| KR | 10-2002-0075039 A | 10/2002 |
| KR | 10-2012-0017190 A | 2/2012 |

* cited by examiner

METHOD FOR PREVENTING DAMAGE TO DRIVING SYSTEM IN VEHICLES

CROSS-REFERENCE TO RELATED APPLICATION

The present application claims priority to Korean Patent Application No. 10-2015-0138390 filed on Oct. 1, 2015, the entire contents of which is incorporated herein for all purposes by this reference.

BACKGROUND

Field of the Invention

The present disclosure relates to a method for preventing damage to a driving system in vehicles. More particularly, it relates to a method for preventing damage to a driving system in vehicles which may occur when driving a 4-wheel drive vehicle.

Description of Related Art

In general, 4-wheel drive, which is a technique of transmitting power to all four wheels in driving a vehicle, may be divided into part time 4-wheel drive and full time 4-wheel drive.

For part time 4-wheel drive, only two wheels are driven in normal times and four wheels are selectively driven on a rough road. For full time 4-wheel drive, the driving force is transferred to the four wheels at all times to drive the four wheels. Full time 4-wheel drive is also called all wheel drive (AWD).

For a vehicle adopting full time 4-wheel drive, both the front wheel axle and the rear wheel axle are connected to the transmission to distribute power of the engine to the front wheels and rear wheels, and a driveshaft is used to transfer driving force to the front wheels.

A typical 4-wheel drive vehicle has a power transmission structure in which the driving force output from the engine is transferred to a transfer case via the transmission and then distributed to the rear wheel side and the front wheel side. Front wheel driveshafts, a front wheel differential and the like are installed between the transfer case and the front wheels. When a 4-wheel drive vehicle is operated by transferring driving force of the engine to the front wheels in addition to the rear wheels, the driving force output from the engine is transferred to the front wheels via the front wheel driveshafts and the front wheel differential.

When a conventional 4-wheel drive vehicle stops on a road, the front wheels of the vehicle contact the road with high friction, while the rear wheels contact the road with a low friction. If the vehicle in this state starts to make a full turn and to move with wide open throttle (WOT), the rear wheels may slip, thereby producing a maximum torque acting as an impact causing damage to the front wheel driveshaft.

When the vehicle makes a full turn, the fracture strength of the driveshafts becomes the lowest and thus the risk of damage to the driveshafts increases.

In the conventional art, the size of the driveshafts is increased to attenuate the risk of damage to the driveshafts caused by a maximum impact torque applied to the driveshafts in a state in which the fracture strength of the front wheel driveshafts is lowered.

However, increase in size of the driveshafts may lead to increase in manufacturing costs and weight of a vehicle, thereby causing deterioration in fuel efficiency. In addition, the layout becomes disadvantageous. Therefore, interference between neighboring components occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for preventing damage to a driving system in vehicles by changing and controlling the limit torque of an all wheel drive (AWD) torque transferred to the wheels through a driveshaft to prevent damage to the driveshaft under driving conditions in which the fracture strength of the driveshaft is lowered.

In one aspect, the present invention provides a method for preventing damage to a driving system in vehicles, the method including: a first step of determining whether a 4-wheel drive vehicle turns based on a steering angle signal; a second step of determining, based on an accelerator opening rate signal of the vehicle, whether a maximum torque capable of causing damage to front wheel driveshafts is produced; a third step of checking a bump stroke amount of the vehicle and determining whether the front wheel driveshafts are likely to be damaged by a maximum torque transferred to the front wheel driveshafts when the vehicle turns; and a fourth step of lowering, when the front wheel driveshafts are likely to be damaged, a maximum value of a 4-wheel drive torque applied to the front wheel driveshafts.

In an exemplary embodiment, the determining of whether r the maximum torque of the second step is applied to the front driveshafts may include determining whether slip of rear wheels occurs based on a signal indicating a wheel speed of front wheels and a signal indicating a wheel speed of rear wheels. When a difference between the wheel speed of the front wheels and the wheel speed of the rear wheels is greater than or equal to a threshold value, it may be determined that slip of the rear wheels occurs.

The third step may include checking the bump stroke amount of the vehicle based on a ride height change rate, the ride height change rate indicating change in height from the ground to a floor of the vehicle and determining, when the ride height change rate is higher than or equal to a first reference value set as a minimum value indicating a possibility of the front wheel driveshafts damage by the maximum torque applied thereto, that the front wheel driveshafts are likely to be damaged by the maximum torque transferred thereto when the vehicle turns.

In addition, when the ride height change rate is higher than or equal to a first reference value set as a minimum value indicating a possibility of the front wheel driveshafts damage by the maximum torque applied thereto and is lower than or equal to a second reference value set as a maximum value indicating a possibility of the front wheel driveshafts damage by the maximum torque applied thereto, it is determined that the front wheel driveshafts are likely to be damaged by the maximum torque transferred thereto when the vehicle turns.

In another exemplary embodiment, the fourth step may include determining a limit torque for limiting the maximum torque of the 4-wheel drive torque according to "Fracture strength*2(LH+RH)/Front wheel differential gear ratio".

Herein, the fracture strength may be a fracture strength of the front wheel driveshafts, LH may denote a torque applied to the left driveshaft of the front wheel driveshafts disposed between the left front wheel and the front wheel differential, and RH may denote a torque applied to a right driveshaft of the front wheel driveshafts disposed between the right front wheel and the front wheel differential.

In addition, the maximum torque of the 4-wheel drive torque may be limited to a value of the determined limit torque for an established limit torque maintenance time.

Other aspects and exemplary embodiments of the invention are discussed infra.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
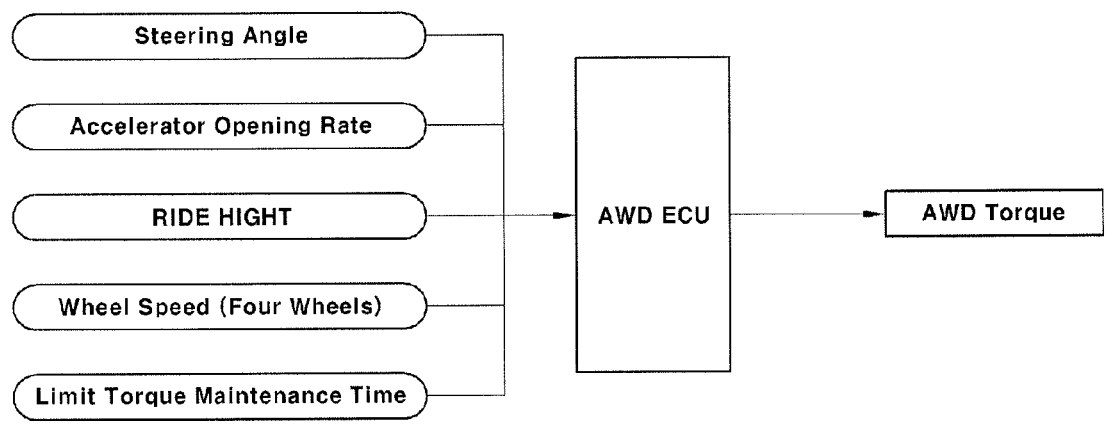
FIG. 1 is a diagram illustrating input signals which are necessary to implement a method for preventing damage to a driving system in vehicles according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In general, a front engine rear wheel drive (FR)-based full time 4-wheel drive vehicle switches from full time 4-wheel drive to FR in some cases, and thus the four wheels including the front wheels and rear wheels are used as driving wheels full time or part time. In this case, the driving force transferred to the front wheel side is transferred to the front wheels via a front wheel driveshaft and a front wheel differential.

The present disclosure relates to a method for preventing damage to an FR-based driving system of full time 4-wheel drive in vehicles. In particular, the present invention provides a method for preventing damage to a front wheel driveshaft by changing the limit of an AWD torque (or 4-wheel drive torque) in a driving situation adversely affecting the fracture strength of the front wheel driveshafts constituting the driving system of a full time 4-wheel drive vehicle.

Hereinafter, description will be given with reference to the accompanying drawings such that those skilled in the art can easily implement the present invention.

In the following description, all wheel drive (AWD) torque and 4-wheel drive torque will be interchangeably used as a driving torque that is output from the engine of the full time 4-wheel drive vehicle and transferred to the wheels.

The 4-wheel drive torque may be determined and controlled by a controller for performing a control operation related to operation of an AWD driving system including a transmission, a transfer case, a driveshaft and a differential of the vehicle. For example, the 4-wheel drive torque may be controlled according to an indication torque of an electronic control unit (ECU) configured to control operation of the transfer case.

Figure 2:
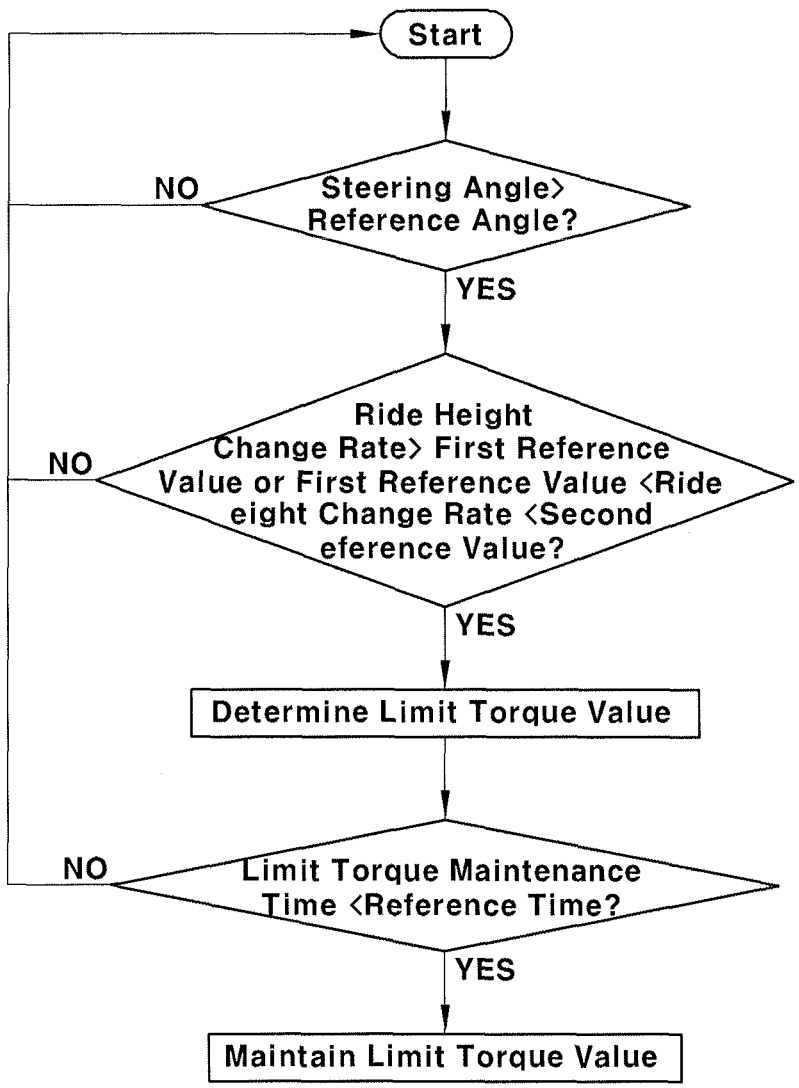
FIG. 2 is a schematic flowchart illustrating a method for preventing damage to a driving system in vehicles according to an embodiment of the present invention.

FIG. 1 is a diagram illustrating input signals which are necessary to implement a method for preventing damage to a driving system in vehicles according to an exemplary embodiment of the present invention, and FIG. 2 is a schematic flowchart illustrating a method for preventing damage to a driving system in vehicles according to an exemplary embodiment of the present invention.

As shown in FIG. 1, a controller (AWD ECU) receives signals of a steering angle, an accelerator opening rate, a ride height, wheel speeds of four wheels and the like to determine and control 4-wheel drive torque.

The controller determines whether the vehicle travels straight ahead or turns based on the steering angle signal, and determines, based on the accelerator opening rate signal, whether or not a maximum impact torque (i.e., a maximum impact torque of the 4-wheel drive torque) has been generated by sudden rise of the engine torque.

If the accelerator opening rate changes suddenly, the engine torque rises drastically, thereby generating a maximum torque acting as an impact which is likely to cause damage to the front wheel driveshaft. Therefore, the maximum impact torque may cause damage to the driveshaft whose fracture strength is reduced.

In order to determine whether the accelerator opening rate has changed suddenly, the controller may detect and check the change rate of the accelerator opening rate in real time, and determine that a sudden change of the accelerator opening rate has occurred if the change rate of the accelerator opening rate is greater than or equal to a predetermined reference change rate.

Herein, the reference change rate, which is intended to determine occurrence of sudden change of the accelerator opening rate, may be set to a value derived from experimentation and evaluation in an actual vehicle environment or a typical value.

In addition, the controller may check occurrence of a bump stroke in the vehicle and a bump stroke amount (bump state) based on the ride height signal, thereby determining and recognizing a full bump situation in which the fracture strength of the driveshaft becomes the lowest.

The ride height, which indicates a height from the ground to the floor of the vehicle (or a height from the ground to the rear arm of the suspension), may be detected by a vehicle height sensor installed on the vehicle. The change rate of the bump stroke amount may be checked based on the change rate of the ride height.

Herein, the bump state of the vehicle represents a state in which the height of the vehicle floor is raised as the suspension is compressed. The state in which the suspension is shortened (compressed) to the maximum degree is called a full bump state.

In other words, when the suspension is compressed and extended (restored), the height from the rear arm of the suspension to the ground changes. Accordingly, the bump state of the vehicle according to compression of the suspension may be checked based on the change rate of the ride height per unit time.

In addition, the controller calculates the travel speed of the vehicle based on the wheel speed signals of the front wheels and rear wheels and determine whether or not slip of the rear wheels has occurred.

For example, if the vehicle speed checked based on the wheels speed signals of the four wheels is higher than or equal to an established reference vehicle speed, and the difference in wheel speed between the front wheels and the rear wheels is greater than or equal to a predetermined threshold value, it is determined that slip has occurred on the rear wheels of the vehicle during driving.

Herein, the reference vehicle speed is set to a speed at which slip of the rear wheels is determined to be likely to occur, and a value derived from experimentation and evaluation in an actual vehicle environment or a typical value may be determined as the reference vehicle speed. In addition, the technology of calculating vehicle speed based on the wheel speeds is well known in the art, and therefore a detailed description thereof will not be given.

Typically, when the vehicle turns, the maximum joint angle of the front wheel driveshaft is determined according to the bump stroke amount of the suspension vehicle. The fracture strength of the driveshaft decreases as the joint angle of the front wheel driveshaft increases. In particular, if the maximum 4-wheel drive torque is applied to the front wheel driveshaft when the bump stroke amount is within a certain range, the front wheel driveshaft is highly likely to be damaged.

That is, when a bump stroke amount of the vehicle is given within a certain range when the joint angle of the front wheel driveshaft occurs while the vehicle turns, and the front wheel drive shaft is bend to the extent of the damage-possible range, the front wheel driveshaft may be damaged by the maximum 4-wheel drive torque applied to the front wheel driveshaft.

Accordingly, the front wheel driveshaft may be protected from damage caused by the maximum 4-wheel drive torque applied thereto by attenuating the 4-wheel drive torque in a bump state in which the joint angle occurs within the range of the front wheel driveshaft being damaged when the vehicle turns and a maximum impact torque is applied.

Hereinafter, the method of the present invention for preventing damage to the driving system in vehicles will be described with reference to FIG. 2.

As shown FIG. 2, the turning state of the vehicle is checked based on the steering angle signal. If the detected steering angle is greater than or equal to a predetermined reference angle, it is determined that the vehicle is turning.

The reference angle is an angle by which the vehicle is determined to be turning. The reference angle is derived from experimentation and evaluation under an actual vehicle environment and is properly set according to each vehicle (or each vehicle type).

Next, occurrence of slip of the rear wheels is determined based on the wheel speed signals of the wheels. If the difference in wheel speed between on the front wheels and the rear wheels is greater than or equal to a predetermined threshold value, it is determined that slip of the rear wheels of the vehicle has occurred.

For example, if the vehicle speed checked based on the wheel speed signals of the four wheels is greater than or equal to an established reference vehicle speed and a value obtained by subtracting the wheel speed of the front wheels from the wheel speed of the rear wheels is greater than zero, it is determined that the rear wheels of the vehicle traveling at a certain speed have slipped.

If an impact torque is produced due to sudden rise of the engine torque while slip of the rear wheels occurs, it may be determined that the impact torque is applied to the front wheel driveshaft. That is, it may be determined, based on the wheel speed signals of the wheels, whether or not the impact torque is likely to be applied (input) to the front wheel driveshaft.

Next, occurrence of impact torque according to sudden rise of the engine torque is checked based on the accelerator opening rate signal. If the detected accelerator opening rate is higher than or equal to a predetermined reference opening rate, it is determined that a maximum impact torque which may cause damage to the front wheel driveshaft has been produced according to sudden rise of the engine torque.

Subsequently, the bump stroke amount of the vehicle is checked based on the change rate of the ride height. The bump stroke amount and the change of the ride height per unit time may be checked based on the ride height change rate. Accordingly, if the ride height change rate is higher than or equal to a predetermined reference change rate (or a first reference value), it is recognized that the front wheel driveshaft of the vehicle which is making a turn may be damaged due to deterioration of the fracture strength thereof resulting from occurrence of a bump stroke in the suspension.

Alternatively, if the ride height change rate is higher than or equal to a first predetermined reference value (reference change rate) and is lower than or equal to a second reference value, it is recognized that the fracture strength of the front wheel driveshaft of the vehicle which is making a turn is reduced to a level at which the front wheel driveshaft may be damaged by the maximum 4-wheel drive torque applied as the front wheel driveshaft is severely angled due to occurrence of a bump stroke in the suspension.

In other words, if the ride height change rate is higher than or equal to the first predetermined reference value, the fracture strength of the front wheel driveshaft of the vehicle making a turn is lowered due to occurrence of bump in the suspension. Particularly, if the ride height change rate is between the first predetermined reference value and the second predetermined reference value, the fracture strength of the front wheel driveshaft becomes the worst due to occurrence of bump in the suspension.

Herein, the first reference value and the second reference value are set to correspond to the minimum value and the maximum value in a bump stroke amount range within which the front wheel driveshaft is likely to be bent and damaged when the maximum impact torque is applied. The first reference value and the second reference value are set to values derived from experimentation and evaluation under an actual vehicle environment.

If the bump condition adversely affecting the angle of the front wheel driveshaft is satisfied as turning of the vehicle causing the front wheel driveshaft to be angled occurs, the fracture strength of the driveshaft is reduced, and thus the front wheel driveshaft is likely to be damaged by the maximum 4-wheel drive torque applied thereto. Accordingly, the limit torque of the 4-wheel drive torque is determined and controlled according to Equation 1 below in order to attenuate the maximum 4-wheel drive torque applied to the front wheel driveshaft.

$$\text{Limit torque} = \text{Fracture strength} * 2(LH+RH)/\text{Front wheel differential gear ratio} \quad \text{Equation 1:}$$

Herein, fracture strength is the fracture strength of the front wheel driveshaft, LH denotes a torque applied to a left (or driver's seat side) driveshaft of the front wheel driveshaft that is disposed between the left front wheel and the front wheel differential, and RH denotes a torque applied to a right (or front passenger seat-side) driveshaft that is disposed between the right front wheel and the front wheel differential. The front wheel differential gear ratio denotes a predetermined gear ratio of the front wheel differential installed on the vehicle and is set to a value (constant) determined when the vehicle is designed.

Herein, Equation 1 assumes that the same torque is applied to the left and right driveshafts.

In addition, the limit torque is a torque value given to limit the maximum torque of the 4-wheel drive torque. The maximum torque of the 4-wheel drive torque applied to the front wheel driveshafts during travel of the AWD vehicle may be attenuated by attenuating the limit torque using Equation 1.

The limit torque determined in this way limits the maximum torque of the 4-wheel drive torque for an established limit torque maintenance time. In other words, the maximum torque of the 4-wheel drive torque is limited to the value of the determined limit torque for the established limit torque maintaining time. Herein, the limit torque maintenance time may be determined by hysteresis and be tunable according to the properties of the vehicle through a certain experiment and evaluation.

In conventional cases, the limit torque for limiting the maximum torque of the 4-wheel drive torque transferred to the wheels is fixed to a certain value on all conditions, and thus when an unfavorable condition is met in terms of the strength of the driveshafts, the front wheel driveshafts are damaged by an impact torque applied thereto. However, in an exemplary embodiment of the present invention, the limit torque is changed according to the driving condition of the vehicle in consideration of a situation in which the strength of the driveshafts is lowered. Accordingly, when driveshafts are unfavorably angled, the maximum torque of the 4-wheel drive torque applied to the front wheel driveshafts is attenuated to prevent damage to the driveshafts without increasing the size of the driveshafts.

As is apparent from the above description, the present invention provides the following effects.

According to embodiments of a method of the present invention for preventing damage to the driving system in vehicles, damage to the driveshaft may be prevented by changing and optimizing the limit of the AWD torque by recognizing a situation in which conditions (e.g., a turn condition, a bump condition) adversely affecting the fracture strength of the driveshaft are given. In this case, damage to the driveshaft may be prevented without increasing the size of the driveshafts. Accordingly, manufacturing costs and weight of a vehicle may be reduced and fuel efficiency may be improved, compared to conventional cases.

Therefore, damage to the front wheel driveshafts may be prevented in a rear wheel drive (FR)-based all wheel drive (AWD) vehicle, while the AWD torque is maximized within an allowable range.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for preventing damage to a driving system in a vehicle, the method comprising:
    A first step of determining whether a 4-wheel drive vehicle turns based on a steering angle signal;
    A second step of determining, based on an accelerator opening rate signal of the vehicle, whether a maximum torque causing damage to front wheel driveshafts is produced;
    A third step of checking a bump stroke amount of the vehicle and determining whether the front wheel driveshafts are in a state of being damaged by the maximum torque transferred to the front wheel driveshafts when the vehicle turns; and
    A fourth step of lowering, when the front wheel driveshafts are determined to be in a state of being damaged, a maximum torque of a 4-wheel drive torque applied to the front wheel driveshafts by changing a limit torque of the 4-wheel drive torque for limiting the maximum torque of the 4-wheel drive torque.

2. The method of claim 1, wherein determining whether the maximum torque of the second step is applied to the front wheel driveshafts comprises:
    determining whether slip of rear wheels occurs based on a signal indicating a wheel speed of front wheels and a signal indicating a wheel speed of the rear wheels.

3. The method of claim 2, wherein, when a difference between the wheel speed of the front wheels and the wheel speed of the rear wheels is greater than or equal to a set threshold value, it is determined that the slip of the rear wheels occurs.

4. The method of claim 1, wherein, in the third step, the checking of the bump stroke amount comprises:
    checking the bump stroke amount of the vehicle based on a ride height change rate, the ride height change rate indicating change in height from the ground to a floor of the vehicle.

5. The method of claim 1, wherein the third step further comprises:
    checking the bump stroke amount of the vehicle based on a ride height change rate and determining, when the ride height change rate is higher than or equal to a first reference value set as a minimum value indicating a possibility of the front wheel driveshafts being damaged by the maximum torque applied thereto, that the front wheel driveshafts are in a state of being damaged by the maximum torque transferred thereto when the vehicle turns.

6. The method of claim 1, wherein the third step comprises:
checking the bump stroke amount of the vehicle based on a ride height change rate and determining, when the ride height change rate is higher than or equal to a first reference value set as a minimum value indicating a possibility of the front wheel driveshafts being damaged by the maximum torque applied thereto and is lower than or equal to a second reference value set as a maximum value indicating a possibility of the front wheel driveshafts being damaged by the maximum torque applied thereto, that the front wheel driveshafts are in a state of being damaged by the maximum torque transferred thereto when the vehicle turns.

7. The method of claim 1, wherein the fourth step comprises:
determining the limit torque for limiting the maximum torque of the 4-wheel drive torque according to "Fracture strength*2(LH+RH)/Front wheel differential gear ratio",
wherein the fracture strength is a fracture strength of the front wheel driveshafts, the LH denotes a torque applied to the left driveshaft to of the front wheel driveshafts, and the RH denotes a torque applied to a right driveshaft of the front wheel driveshafts.

8. The method of claim 7, wherein the maximum torque of the 4-wheel drive torque is limited to a value of the determined limit torque for an established limit torque maintenance time.

9. The method of claim 1, wherein the 4-wheel drive torque is determined and controlled by a controller for performing a control operation related to operation of an all wheel drive (AWD) driving system including a transmission, a transfer case, front driveshafts and a differential of the vehicle.

10. The method of claim 1, wherein the 4-wheel drive torque is controlled according to an indication torque of an electronic control unit (ECU) configured to control operation of the transfer case.

11. The method of claim 1, wherein, in the third step, the checking of the bump stroke amount comprises:
checking the bump stroke amount of the vehicle based on a ride height change rate, the ride height change rate indicating change in height from the ground to a rear arm of a suspension of the vehicle.

12. The method of claim 8, wherein the established limit torque maintenance time is determined by hysteresis and tunable according to properties of the vehicle.

* * * * *